(12) United States Patent
Jeon

(10) Patent No.: US 6,385,160 B1
(45) Date of Patent: May 7, 2002

(54) PICKUP ADJUSTING APPARATUS OF A DISK PLAYER

(75) Inventor: Chul-ho Jeon, Kwacheon (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 08/686,526

(22) Filed: Jul. 26, 1996

(30) Foreign Application Priority Data

Jun. 29, 1996 (KR) ............................................. 96-25939

(51) Int. Cl.[7] .................................................. G11B 5/56
(52) U.S. Cl. ....................................... 369/219; 369/249
(58) Field of Search ................................ 369/215, 219, 369/244, 75.2, 249, 255; 360/106, 109

(56) References Cited

U.S. PATENT DOCUMENTS

| | | | |
|---|---|---|---|
| 4,947,481 A | * 8/1990 | Ikedo et al. | 369/215 |
| 5,036,507 A | * 7/1991 | Yamashita | 369/215 X |
| 5,124,974 A | * 6/1992 | Kato et al. | 369/215 X |
| 5,375,115 A | * 12/1994 | Shimegi et al. | 369/244 |
| 5,488,526 A | * 1/1996 | Sakashita et al. | 360/106 |
| 5,621,713 A | * 4/1997 | Sato et al. | 369/75.2 |

FOREIGN PATENT DOCUMENTS

| | | | |
|---|---|---|---|
| JP | 63-313370 | * 12/1988 | 369/215 |
| JP | 1-282739 | * 11/1989 | 369/215 |

* cited by examiner

Primary Examiner—William Korzuch
(74) Attorney, Agent, or Firm—Sughrue Mion, PLLC

(57) ABSTRACT

A pickup tilt adjustment apparatus in a disk player which includes a deck and a pickup. The pickup adjusting apparatus includes at least one pair of guide shafts installed on the deck and for supporting and guiding the pickup. Each of the guide shafts has a hole at least one end thereof. An adjusting member is inserted into each hole and threadedly engaged with the deck. A spring is installed between each of the guide shafts and the deck and provides a resistive force against a rotation of the adjusting member and biases the guide shafts away from the deck, thereby to maintain an appropriate distance between the deck and each of the guide shafts.

3 Claims, 3 Drawing Sheets

PICKUP ADJUSTING APPARATUS OF A DISK PLAYER

BACKGROUND OF THE INVENTION

The present invention relates to a pickup in an optical disk player and, more particularly, to a pickup adjusting apparatus which enables fine adjustments to the tilt of a pickup so that the pickup can be maintained horizontal with respect to a disk.

In an optical disk player such as a CDP (compact disk player), an LDP (laser disk player) or a DVDP (digital video disk player), a pickup should be maintained horizontal with respect to a disk so that a laser beam emitted from the pickup is vertically incident on the disk.

FIG. 1 illustrates the pickup portion of a typical disk player. As shown in the drawing, a turntable 1 for receiving a disk (not shown) and a pair of guide shafts 2 for supporting a pickup 3 are installed on a deck 4. To one side of the pickup 3, a tooth gear portion (not shown) for engaging with a screw shaft 5 is formed. The screw shaft 5 is driven by a driving motor 6.

In the disk player having the above structure, when the driving motor 6 rotates the screw shaft 5, the rotation of the screw shaft 5 slides the pickup 3 along the guide shafts 2. Accordingly, as the pickup 3 moves in a radial direction of the disk, information recorded on the disk is read by the pickup 3.

When reading information from the disk, the laser beam emitted from the pickup 3 should be perpendicularly incident on a desired position on the disk. However, pickup errors, due to a focusing error or an inclination error of the pickup 3, sometimes occur. The focusing error occurs when the laser beam does not appropriately converge on the disk according to the distance between the disk and the pickup 3. The inclination error occurs when the pickup 3 is inclined in a radial direction or a tangential direction with respect to the disk. Such errors can be compensated for by the focusing and tracking servo mechanism of the pickup 3, but only to a limited degree since the guide shafts 2, which support the pickup 3, are fixedly mounted to the deck 4 by fixing portions 7 during the assembling process. Thus, complete compensation for the errors may not be possible. Further, in the case where accuracy is low during assembly and there is a large tolerance, correction for the above-mentioned errors becomes impossible.

SUMMARY OF THE INVENTION

To solve the above problems, it is an object of the present invention to provide a pickup adjusting apparatus in an optical disk player which enables fine adjustment to the tilt of a pickup to thereby correct inclination errors in a radial direction of a disk.

Accordingly, to achieve the above object, there is provided a pickup tilt adjustment apparatus in a disk player which includes a deck and a pickup. The pickup adjusting apparatus includes at least one pair of guide shafts installed on the deck and for supporting and guiding the pickup. Each of the guide shafts has a hole at least one end thereof, an adjusting means inserted into each hole and threadedly engaged with the deck, and a spring installed between each of the guide shafts and the deck and for providing a resistive force against a rotation of the adjusting means and biasing the guide shafts away from the deck, thereby to maintain an appropriate distance between the deck and each of the guide shafts.

BRIEF DESCRIPTION OF THE DRAWINGS

The above object and advantages of the present invention will become more apparent by describing in detail a preferred embodiment thereof with reference to the accompanying drawings, in which.

DETAILED DESCRIPTION OF THE INVENTION

Figure 1:
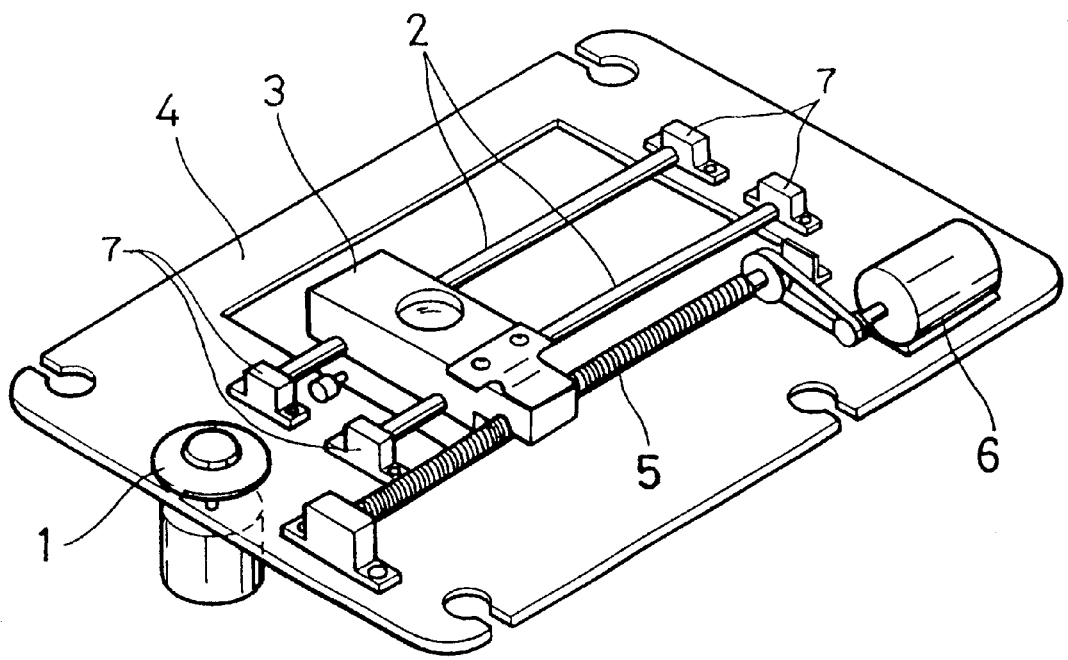
FIG. 1 is a perspective view showing the pickup portion of a typical optical disk player.
Figure 2:
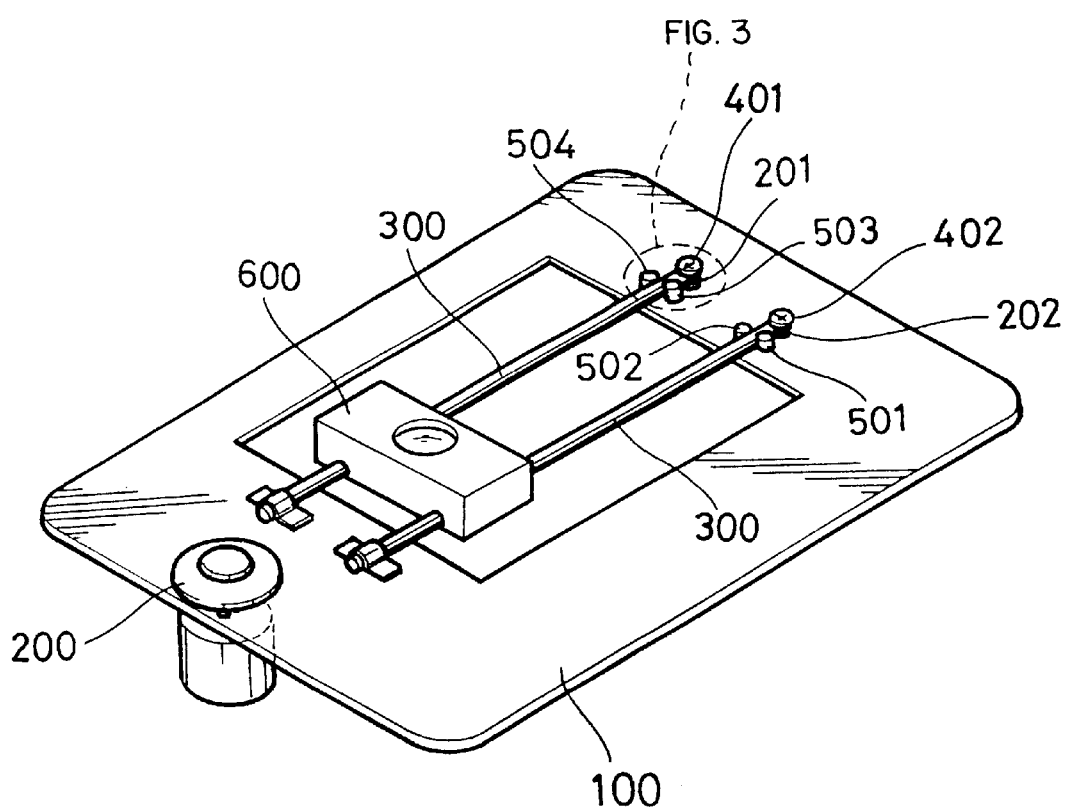
FIG. 2 is a perspective view showing a disk player equipped with a pickup adjusting apparatus according to the present invention.
Figure 3:
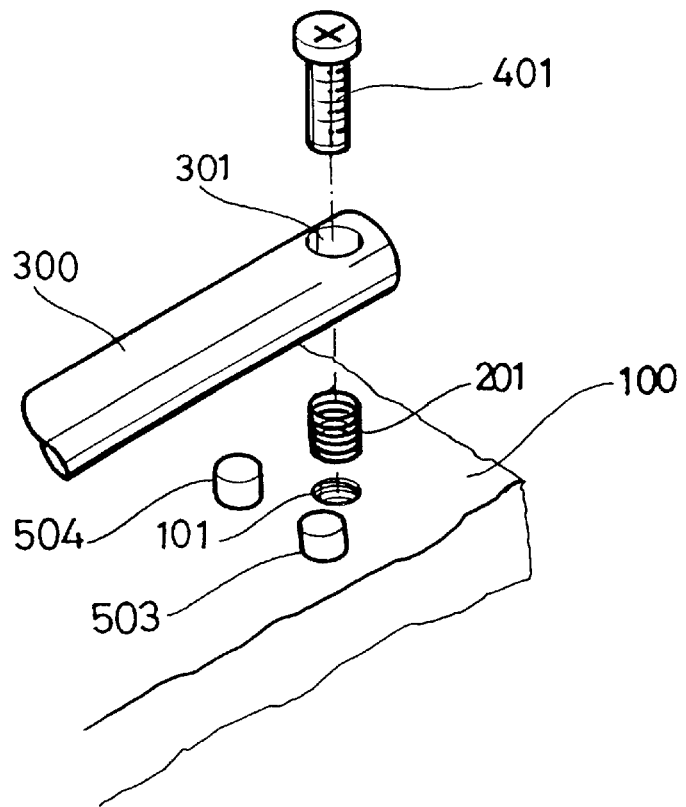
FIG. 3 is an exploded fragmentary perspective view showing the pickup adjusting apparatus according to the present invention.
Figure 4:
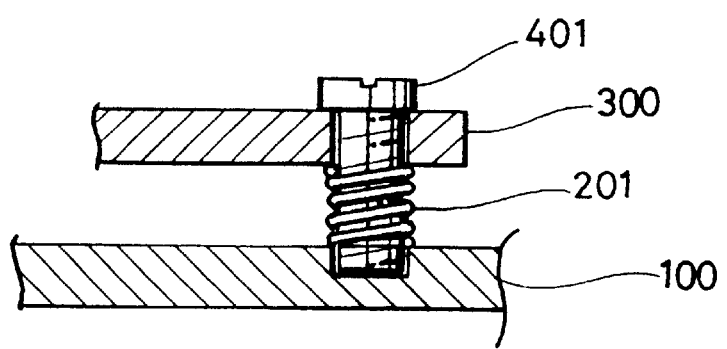
FIG. 4 is a sectional view illustrating the assembled pickup adjusting apparatus according to the present invention.

FIG. 2 shows the pickup assembly of a disk player provided with a pickup adjusting apparatus according to the present invention, and FIGS. 3 and 4 illustrate the pickup adjusting apparatus in greater detail.

Referring to the drawings, a pair of guide shafts 300 for guiding the movement of a pickup 600 with respect to a turntable 200 is installed on a deck 100 and a hole 301 (see FIG. 3) is formed at one end of each guide shaft 300. Adjusting means 401 and 402, such as screws, bolts and the like, are inserted into the holes 301 of the respective guide shafts, and then threadedly engaged with screw or threaded holes 101 formed in the deck 100, thereby connecting the guide shafts 300 to the deck 100.

Springs 201 and 202, which are disposed around the adjusting means 401 and 402, respectively, are provided between the deck 100 and the guide shafts 300. Also, a plurality of supporting members 501, 502, 503 and 504 for restricting lateral movements of the guide shafts 300 are installed on the deck 100 at either side of the guide shafts 300.

The operation of the pickup adjusting apparatus having the above structure will now be described. When the adjucting means 401 is rotated clockwise or counterclockwise to adjust a tilt of the pickup 600, the adjusting means 401 moves up or down due to the threaded engagement with the screw hole 101 in the deck 100. At this time, the spring 201 provides a resistive force against rotation of the adjusting means 401 and biases the guide shaft 300 to thereby maintain an appropriate distance between the deck 100 and the guide shaft 300. Further, the supporting members 501, 502, 503 and 504 prevent lateral movements of the guide shafts 300 generated when the adjusting means 401 and 402 are rotated.

Thus, the radial directional tilt of the pickup 600 can be adjusted by turning the adjusting means 401 and 402 a proper number of times to thereby adjust the height of one end of each guide shaft 300.

As described above, the pickup adjusting apparatus of an optical disk player according to the present invention allows a pickup to be positioned parallel to a disk rotating on a turntable. Therefore, the present invention improves the reliability of the focusing and tracking servo mechanisms and, the reproduction efficiency of the disk player.

It is contemplated that numerous modifications may be made to the pickup adjusting apparatus of the present invention without departing from the spirit and scope of the invention as defined in the following claims.

What is claimed is:

1. A pickup adjusting apparatus in an optical disk player which includes a deck and a pickup, said pickup adjusting apparatus comprising:

at least one pair of guide shafts installed on the deck and for supporting and guiding the pickup, each of said guide shafts having a hole at least one axial end thereof;

an adjusting member inserted into each said hole and threadedly engaged with the deck; and a spring installed between each of said guide shafts and the deck and for providing a resistive force against a rotation of said adjusting member and biasing said guide shafts away from the deck, thereby to allow appropriate adjustment of the distance between the deck and each of said guide shafts.

2. The pickup adjusting apparatus in an optical disk player as claimed in claim 1, further comprising supporting members, fixedly mounted on the deck at both sides of each of said guide shafts, for restricting lateral movements of said guide shafts.

3. The pickup adjusting apparatus in an optical disk player as claimed in claim 1, wherein said adjusting member comprises a threaded screw.

* * * * *

UNITED STATES PATENT AND TRADEMARK OFFICE
CERTIFICATE OF CORRECTION

PATENT NO.   : 6,385,160 B1  
DATED        : May 7, 2002  
INVENTOR(S)  : Chul-Ho Jeon It is certified that error appears in the above-identified patent and that said Letters Patent is hereby corrected as shown below:

<u>Title page,</u>
Item [*] Notice, delete "0" and insert -- 914 --.

Signed and Sealed this

Sixth Day of April, 2004

JON W. DUDAS
*Acting Director of the United States Patent and Trademark Office*